United States Patent [19]

Kuti et al.

[11] Patent Number: 4,735,490
[45] Date of Patent: Apr. 5, 1988

[54] ELECTRO-OPTICAL LIGHT MODULATOR HAVING A REDUCED PIEZO-OPTICAL EFFECT

[75] Inventors: Csaba Kuti; Péter Kälmän; József Bakos; Tibor Juhäsz; Lázló Vannay, all of Budapest, Hungary

[73] Assignee: Budapesti Muszaki Egyetem, Budapest, Hungary

[21] Appl. No.: 852,670

[22] PCT Filed: Jul. 16, 1985

[86] PCT No.: PCT/HU85/00045
§ 371 Date: May 5, 1986
§ 102(e) Date: May 5, 1986

[87] PCT Pub. No.: WO86/00722
PCT Pub. Date: Jan. 30, 1986

[30] Foreign Application Priority Data

Jul. 16, 1984 [HU] Hungary ............... 2770/84

[51] Int. Cl.⁴ .................................. G02F 1/03
[52] U.S. Cl. ............................. 350/387; 350/388
[58] Field of Search ................. 350/356, 387–388, 350/390, 405; 372/27–28, 33, 68, 105

[56] References Cited

U.S. PATENT DOCUMENTS 1,670,757  5/1928  Bronk ................... 350/371
2,024,737  12/1935  Klingsporn ............ 350/387
3,572,897  3/1971  Bousky ................. 350/356

OTHER PUBLICATIONS

Carpenter, R. O'B., "The Electro-Optic Effect in Uniaxial Crystals of the Dihydrogen Phosphate Type. III Measurements of Coefficients", Jr. Optical Soc. America, vol. 40, 4–1950, pp. 225–229.

Tada et al., "Electrically Controlled Optical Switch", Sumitomo Electric Tech. Review, #19, 1-1980, pp. 47–56.

Kalymnios et al., "Optimisation of 45° y' cut Modulators", Electronics Letters, vol. 6, 11-26-70, pp. 771–773.

Primary Examiner—William H. Punter
Attorney, Agent, or Firm—Schweitzer & Cornman

[57] ABSTRACT

An electro-optical light modulator having a reduced piezo-optical effect by providing a plurality of optically series-connected modulator crystals having geometric dimension differing from one another such that for pulse control the overlapping of acoustical transients generated in the individual modulator crystals is excluded, along the beam path and where periodical control is used, the overlapping of the piezo-electrical resonant frequencies of the individual modulator crystal is excluded.

1 Claim, 1 Drawing Sheet

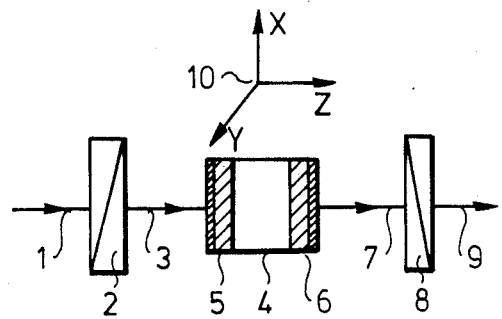
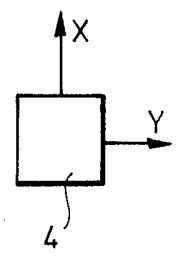
Fig. 1　　　　Fig. 2
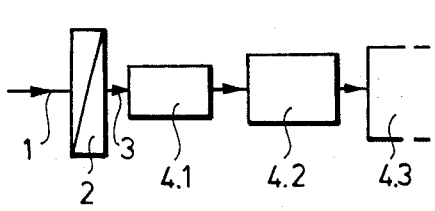
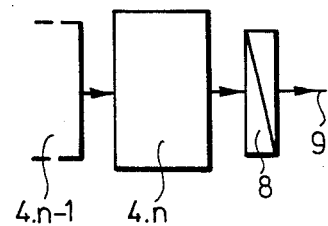
Fig. 3

ELECTRO-OPTICAL LIGHT MODULATOR HAVING A REDUCED PIEZO-OPTICAL EFFECT

BACKGROUND OF THE INVENTION AND DESCRIPTION OF THE PRIOR ART

The invention relates to an optically serially connected electro-optical light modulator put together from modulator crystals which are dimensioned for the reduction of the optical effects arising from the electrical control in a piezo-optical manner, which enables a considerably increased reduction of the disturbing piezo-optical effects disturbing the light modulators during operation and which reduction is proportional with the number of the employed modulator crystals.

For the formation of a laser beam within the resonator, or for the control of the phase, frequency and the polarization of the coherent beam emitted from the resonator, or for the control of the amplitude, or of the intensity of the laser radiation now mainly electro-optical light modulators are used. Such electro-optical light modulators are, for example, described in detail in the corresponding literature by E. D. Mustjel, V. N. Parugin: "Methodi Modulacija i skanirowania sweta", Nauka, Moskau 1970. The operation of electro-optical light modulator is based as known on the double refraction of the electro-optical material which is controllable by an electric field. The essential advantage of the electro-optical light modulators resides in the quick electro-optical effect and in the electrical controllability of the electro-optical effect, which enable a switching of the light with a high speed and also a light modulation having a wide band. The electrically controllable modulator crystal which is split-off from the electro-optical single crystal, modulates with double refraction the phase and the phase difference and also the delay, or the polarization as well as the ellipticity of the components of the passed and linearly polarized light. The light which has been modulated as to its phase or its polarization can be transformed with an appropriate optical system into an intensity modulated or amplitude modulated light. An intensity modulated light may be produced in the simplest fashion by a modulator crystal which is placed between pair of polarizers. In the generally strong piezo-electric linear electro-optical modulator crystals the acoustic waves which are produced by the electrical control in a piezo-electric fashion will influence the operation of the electro-optical light modulator. The technological complexity of the methods employed for the reduction of the piezo-optical effects, and the very high electronic requirements which are made to the controls as well as the damaging consequences to which the modulator parameters are exposed in the known solutions, prompted us to set our task to provide a new electro-optical light modulator having a reduced piezo-optical effect, which at a relatively simple construction will considerably reduce the damaging piezo-optical effects of the acoustic waves.

SUMMARY OF THE INVENTION

The invention rests on the recognition that the piezo-optical effects produced in the individual modulator crystals of an electro-optical light modulator put together from several elements can be separated spacewise in the case of a pulse control (light blocking operation) and in the case of a periodic control (modulator type of operation) according to their frequency by appropriate dimensioning of the outer dimensions.

The said object has been solved with an electro-optical light modulator having a reduced piezo-optical effect, and which comprises several modulator crystals connected in series optically and arranged between polarizers. Such light modulator became further improved according to the invention in that in the case of a pulse control the overlapping of the acoustical transients produced in the individual modulator crystals became dimensioned along the light path with different magnitude for each individual modulator crystal, and in the case of a periodic control the overlapping of the piezo-electric resonant frequencies of the individual modulator crystals became dimensioned exclusive different in the frequency and the modulator crystals connected serially in the optical sense have been designed with geometric dimensions differing from each other. In this connection, it should be apparent that the term "overlapping" means that the equal phase of the acoustic waves in two separate crystals coincide and are thus "overlapped".

With the electro-optical light modulator put together from modulator crystals connected in series and having geometrical dimensions differing from each other the piezo-optical effect can be considerably reduced in the case of periodic control due to the shifting of the resonance spectrum of the individual modulator crystals. By preventing the overlapping of the resonance spectra by the appropriate dimensioning we were able to assure that simultaneously only a single modulator crystal will go into resonance and which due to the low control voltage will have a relatively small influence on the frequency transmission of the composite light modulator. The electro-optical light modulator structure designed for the reduction of the piezo-optical effect, may be applied in all electro-optical light modulators made from piezo-electrical and materials.

The invention will be described in more detailed in the following on hand of a single embodiment with reference to the drawing, in which:

BRIEF DESCRIPTION OF THE DRAWINGS

FIG. 1 illustrates in a schematic fashion a known longitudinal electro-optical light modulator made from a KDP material and arranged between polarizers which are placed vertically with respect to each other;

FIG. 2 is a section of the modulator crystal from the electro-optical light modulator of FIG. 1 having an orientation with respect to the crystallo-graphic axis; and FIG. 3 is an embodiment of the electro-optical light modulator according to the invention, illustrated in a schematic fashion.

DETAILED DESCRIPTION OF THE DRAWINGS

FIG. 1 illustrates a known longitudinal light modulator arrangement, which comprises an isomorphous single crystal made from the known KDP, that is, potassium, dihydro-phosphate material having a cut from 0°Z, (i.e., the optical axis lies along the Z axis) and serving as the modulator crystal. A monochromatic and collimated light beam 1 which is to be modulated passes a polarizer 2 and falls in the form of a linearly polarized light beam 3 on to the modulator crystal 4. Due to the double refraction controlled by the control voltage supplied through the electrodes 5 and 6 of the modulator crystal 4 the light beam 7 which is emitted from the modulator crystal 4 becomes elliptically polarized, and the components which are polarized in the plane are passed through the second polarizer 8, called also as an analyzer. The light beam 9 which is emitted from the polarizer 8 is amplitude modulated, that is, intensity modulated. A rectangular coordinator system 10 illustrates the crystallo-graphic orientation of the modulator crystal 4. The polarizer 2 is set in such a manner, that the light beam 3 will pass the modulator crystal 4 in the crystallo-graphic plane polarized X-Y or Y-Z.

FIG. 2 illustrates the crystallo-graphic orientation of the modulator crystal 4 in the coordinator system 10, with respect to the crystallo-graphic axes X, Y, Z.

FIG. 3 illustrates an electro-optical light modulator put together from modulator crystals which are dimensioned for the separation of the piezo-optical effects. The monochromatic and the collimated light beam 1 which is to be modulated will go through the polarizer 2 and fall in the form of a linearly polarized light beam 3 on to the light modulator which is put together from the modulator crystals 4.1, 4.2, 4.3, ... 4.n−1, 4.n. All of the modulator crystals 4.1 ... 4.n, have geometric dimensions which are differing from each other and are provided with electrodes 5 and 6 on their respective sides for the inputting of the control voltage, and which electrodes are, however, not illustrated in the drawing. The dimensions in the plane X-Y of the consecutive optically serially connected longitude modulator crystals 4.1 ... 4.n having a cut of 0°Z are increased in stages equal to or exceeding the width of the acoustic pulses appearing on the side surfaces of the modulator crystals along the light path, that is an addition of the phase differences caused by the acoustical waves produced in the individual modulator crystals 4.1 ... 4.n may be prevented. Due to the addition of the electro-optical phase differences, directly caused by the electrical control, in the full aperture of the modulator crystals 4.1 ... 4.n, due to the parallel electrical connection of the individual modulator crystals 4.1 ... 4.n, only a partial voltage of 1/n of the value of the half wave voltage required for the full control of one modulator crystal will be necessary for the full control of the light modulator put together from n pieces of modulator crystals. In the individual modulator crystals 4.1 ... 4.n will appear acoustic waves having lower amplitudes and which are proportional to the control voltage not exceeding the half wave voltage, and the phase difference produced by the acoustic waves will sink during the control (opening) of the composite electro-optical modulator due to the control of the individual modulator crystals 4.1 ... 4.n with a partial voltage of 1/n of the half wave voltage and the phase difference will be reduced to a value of 1/n as the value during the controlling performed with a half wave voltage.

Due to the distribution of the acoustic waves along the aperture and which is accomplished by the dimensioning of the modulator crystals 4.1 ... 4.n, the phase differences created in the individual modulator crystals 4.1 ... 4.n will not to be added and the phase differences of 1/n create several reduced piezo-optical openings distributed along the aperture in the transmission of the composite light modulator.

Said piezo-optical openings are disturbing piezo-optical effects which are desirably to be reduced and these openings move from the edges to the center of the aperture. Because the openings are not overlapped, they are not "distributed" along the aperture.

We claim:

1. An electro-optical light modulator having reduced piezo-optical effect, comprising a plurality of optically series-connected modulator crystals arranged between polarizers characterized in that the modulator crystals are provided with geometric dimensions differing from each other in such a manner that in the case of a pulse control, the overlapping acoustic transients generated in said individual modulator crystals along the beam path is excluded and in the case of a periodical control the overlapping of the piezo-electrical resonant frequencies of said individual modulator crystals is excluded.

* * * * *